United States Patent [19]
Hardy et al.

[11] Patent Number: 5,683,061
[45] Date of Patent: Nov. 4, 1997

[54] FIGHTER AIRCRAFT

[76] Inventors: Richard Hardy; Frank D. Neumann; Dennis E. Ruzicka, all of The Boeing Company, P.O. Box 3999, M/S 80-PA, Seattle, Wash. 98124-2499

[21] Appl. No.: 657,143

[22] Filed: Jun. 3, 1996

Related U.S. Application Data

[60] Continuation of Ser. No. 465,076, Jun. 5, 1995, Pat. No. 5,636,813, which is a division of Ser. No. 288,637, Aug. 10, 1994, Pat. No. 5,522,566, which is a continuation of Ser. No. 12,224, Feb. 2, 1993, abandoned.

[51] Int. Cl.$^6$ .................................................. B64D 1/02
[52] U.S. Cl. .................................... 244/118.1; 244/137.1; 244/130; 89/1.54
[58] Field of Search ........................... 244/118.1, 137.1, 244/130, 15, 53 B, 137.4; 89/1.54, 1.815, 1.816

[56] References Cited

U.S. PATENT DOCUMENTS

| | | |
|---|---|---|
| 1,664,899 | 4/1928 | Ries . |
| 2,395,547 | 2/1946 | Hojnowski . |
| 2,709,947 | 6/1955 | Woods . |
| 2,731,885 | 1/1956 | Nolan . |
| 2,787,938 | 4/1957 | Bach . |
| 2,841,346 | 7/1958 | Petter . |
| 2,852,982 | 9/1958 | Musser . |
| 2,958,260 | 11/1960 | Anderson . |
| 2,975,676 | 3/1961 | Butler . |
| 2,998,209 | 10/1961 | Creasey et al. . |
| 3,500,716 | 3/1970 | Schnepfe et al. . |
| 4,208,949 | 6/1980 | Boilsen . |
| 4,232,515 | 11/1980 | Brown . |
| 4,579,300 | 4/1986 | Carr . |
| 4,697,764 | 10/1987 | Hardy et al. . |
| 4,781,342 | 11/1988 | Hardy et al. . |

FOREIGN PATENT DOCUMENTS

| | | |
|---|---|---|
| JPI-285494 | 11/1989 | Japan . |
| JPI-301496 | 12/1989 | Japan . |

OTHER PUBLICATIONS

AvWeek and Space Tech., "ATF Prototypes Outstrip F–15 in Size and Thrust," pp. 44–50, Sep. 17, 1990.

Primary Examiner—Galen L. Barefoot

[57] ABSTRACT

A fighter aircraft achieves low aerodynamic drag and radar signature without sacrificing flight performance through a unique arrangement of the air inlets, the weapons bays, and the main landing gear. Separate main and auxiliary weapons bays permit a narrower fuselage than could be be obtained with a single common bay. Also, the auxiliary weapons bays and the landing gear can be aligned outboard of the main weapons bay without needing to increase the length or width of the aircraft. The air intake ducts extend aft from each intake and curve upwardly and inwardly over the main weapons bay. The result of the design configuration is an aircraft of minimum fuselage width for optimal performance and which has a forward aspect reduced to the minimum necessary to accommodate the components that need forward visibilities, which translates to minimum aerodynamic drag and radar signature.

9 Claims, 3 Drawing Sheets

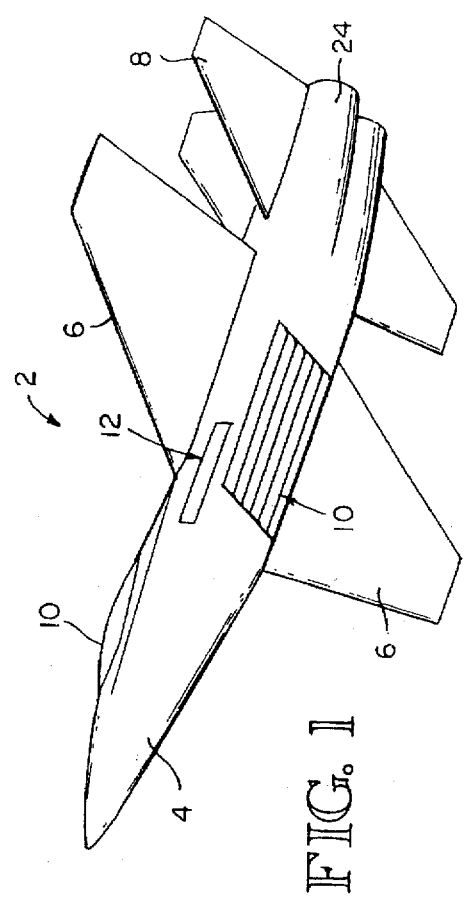
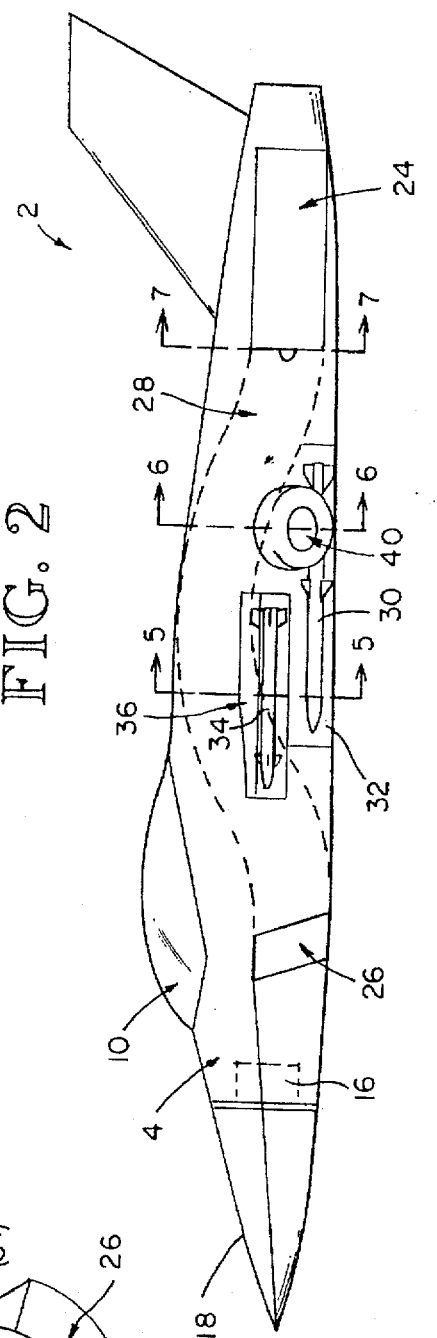
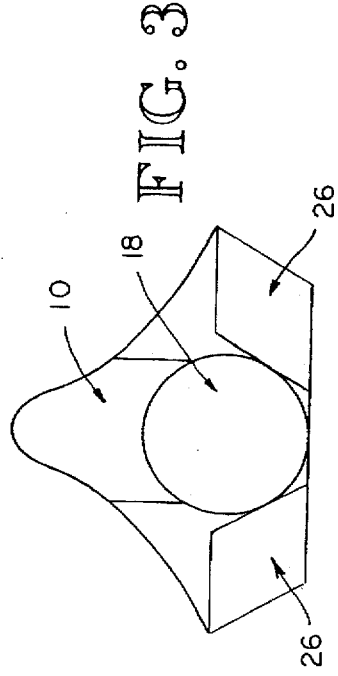
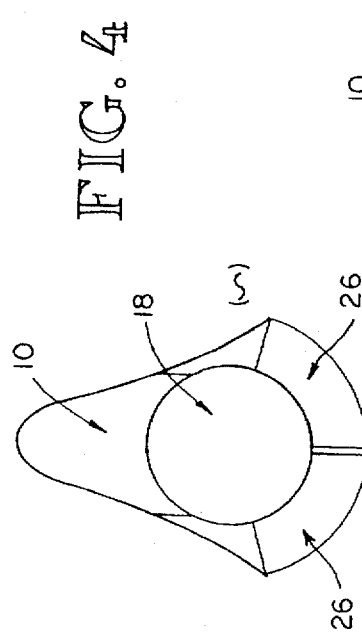
FIG. 1
FIG. 2
FIG. 3
FIG. 4

FIGHTER AIRCRAFT

REFERENCE TO RELATED APPLICATION

The present application is a continuation application based upon U.S. patent application Ser. No. 08/465,076, filed Jun. 5, 1995, now U.S. Pat. No. 5,636,813, issue Jun. 10, 1997, which was a divisional application based upon U.S. patent application Ser. No. 08/288,637, filed Aug. 10, 1994, now U.S. Pat. No. 5,522,566 issued Jun. 4, 1996, which was a continuation application based upon U.S. patent application Ser. No. 08/012,224, filed Feb. 2, 1993, now abandoned.

DESCRIPTION

1. Field of the Invention

This invention relates to fighter aircraft, and more particularly to an arrangement of the components of fighter aircraft, including its engine inlets and ducts, weapons bays, landing gear, canopy and forward-looking radar dome, to minimize the drag and radar signature of the aircraft.

2. Description of the Prior Art

Optimizing the design of modern fighter aircraft generally requires trade-offs between a number of competing design goals. For example, it is important to place several components of the aircraft at or near the aircraft's center of gravity. The weapons bay should be near the aircraft's center of gravity so that the flight characteristics of the airplane do not vary when the weapons are deployed. This consideration is particularly important for the larger, and hence heavier weapons, carried by the airplane. Similarly, the main landing gear should be just slightly behind the airplane's center of gravity so that it is possible to rotate the airplane at relatively low takeoff speeds. The relatively large size of these components generally precludes them all from being located at the airplane's center of gravity.

Minimizing the airplane's drag and radar signature imposes other compromises in optimizing the location of the airplane's components. There are only three basic components of a modern fighter airplane that must have forward visibility. These components are the canopy (so that the pilot can look ahead), the radar dome (so that radar signals can be detected from in front of the airplane) and the air inlets (so that ram air will enter the engine). Radar guided missiles, particularly of the "lock-on-before-launch" variety, must also have forward visibility, but these missiles can be moved from a stowed position to a forward-looking deployed position just prior to launch. Any other components of the airplane that are visible from in front of the airplane will have a tendency to increase both the airplane's drag and its radar signature.

It is often not possible to confine the frontal aspect of fighter airplanes to the combined frontal aspects of the canopy, the radar dome and the engine air inlets. For example, fighter airplanes can accommodate an adequate weapons load only by using two alternative techniques, both of which impose undesirable drag and signature penalties. First, the weapons can be carried externally, generally by attaching them to external pylons.

However, carrying the weapons externally creates a great deal of drag, and the exposed weapons enlarge the signature of the aircraft. Second, the weapons can be carried in an internal weapons bay, traditionally located along the bottom of such airplanes. Carrying weapons in an internal weapons bay avoids the drag and radar signature penalties incurred in carrying the weapons externally. However, an adequate weapons load often can be carried only by using relatively wide weapons bays which have a tendency to make the frontal aspects of such airplanes larger than the combined frontal aspects of the canopy, forward-looking radar dome and engine air inlets. Thus, regardless of which conventional technique is used, adequate weapons loads generally can be carried only by increasing the aerodynamic drag and radar signature of such aircraft.

The need to minimize the radar signature of modern fighter aircraft imposes other constraints on the layout of the aircraft's components. For example, the aircraft's engine faces should be shielded from external view because their rotating parts, particularly their turbine compressor blades, generate relatively large radar signatures. Radar shielding of the engine is normally accomplished by either mounting blocking devices, such as fins, in the inlet ducts or by using curved, relatively long inlet ducts that provide complete line-of-sight blockage of the engine face from any angle. Blocking devices can have a tendency to interfere with the flow of combustion air through the inlet ducts. Long, curved inlet ducts are also undesirable. The length of inlet ducts needed to achieve complete line-of-sight blockage is a function of the degree of curvature of the inlet ducts. Shorter inlet ducts require a greater degree of curvature to adequately shield the engine faces. However, in order for inlet ducts to be of sufficient length to completely shield the engine faces from external view, the inlet ducts must generally pass through the fuselage near the aircraft's center of gravity. Passing relatively large inlet ducts through the airplane's center of gravity has the effect of making it more difficult to position the weapons bay and landing gear at the center of gravity. Relatively long, curved inlet ducts are also undesirable for other reasons. Long, curved inlet ducts can impede the flow of combustion air to the engines. Relatively long engine inlet ducts can also unduly increase the weight of airplanes, particularly since the structural capabilities of the ducts cannot be used. Instead, the ducts generally serve the sole purpose of guiding inlet air to the engines.

It is thus apparent that modern fighter aircraft design involves a number of competing design goals, including the positioning of certain components at the aircraft's center of gravity, minimizing the frontal aspect of the aircraft, shielding the faces of the aircraft's engines from external view and minimizing the aircraft's weight. Conventional wisdom holds that it is not possible to achieve all of these design goals, and that some of these design goals must be compromised for the sake of other design goals.

SUMMARY OF THE INVENTION

It is an object of the invention to provide a fighter aircraft having relatively low drag and a relatively low radar signature.

It is another object of the invention to provide a fighter aircraft that is capable of carrying an adequate weapons load without causing aerodynamic drag or radar signature penalties.

It is another object of the invention to provide a fighter aircraft having its weapons and landing gear located near its center of gravity without causing aerodynamic drag or radar signature penalties.

It is another object of the invention to provide a fighter aircraft having its engine face(s) shielded from external view without imposing undesirable drag, performance or signature penalties.

It is still another object of the invention to deploy lock-on-before-launch weapons in positions where they have a relatively wide field of view.

It is a further object of the invention to utilize airplane components configured for low drag and signature as structural components in order to minimize the weight of the airplane.

These and other objects of the invention are provided by a fighter aircraft having a fuselage, at least one jet engine, an air intake for each jet engine, an air intake duct extending from each air intake to a respective engine, a forward looking radar mounted behind a forward radar dome, a transparent pilot canopy and retractable landing gear. The aircraft is specially adapted to internally carry relatively long missiles, generally using a lock-on-after-launch guidance system, and relatively short missiles, generally using a lock-on-before-launch guidance system. The configuration of the above components allows the aircraft's aerodynamic drag and radar signature to be minimized without sacrificing flight performance. Specifically, the aircraft includes a main weapons bay opening through the bottom of the aircraft's fuselage substantially at its center of gravity. The main weapons bay houses the relatively long missiles. A pair of auxiliary weapons bays opening through opposite sides of the fuselage at or near the aircraft's center of gravity house the relatively short missiles. The main landing gear is positioned slightly behind the aircraft's center of gravity when the landing gear is down. When the landing gear is retracted, it is stowed in respective wells located behind the auxiliary weapons bays in substantial longitudinal alignment with the auxiliary weapons bay. At least one engine intake duct extends from a respective air intake forward of the wings and the center of gravity of the aircraft to a respective engine mounted behind the aircraft's center of gravity. Each engine intake duct curves upwardly above the main weapons bay as it passes through the fuselage to shield the face of the engine from external view and minimize the width of the aircraft. The auxiliary weapons bays and relatively short missiles are preferably supported by the outer walls of respective intake ducts so that the intake ducts are used as structural members to support the auxiliary weapons bays and relatively short missiles. Similarly, the main weapons bay and relatively long missiles are supported by the lower wall of each intake duct so that the intake duct(s) are used as structural members to support the main weapons bays and relatively long missiles. The relatively short weapons are mounted on launch means in the auxiliary weapons bays for deploying the relatively short missiles outboard of the fuselage prior to launch. The forward ends of the relatively short missiles are positioned forward of the leading edges of the wings to provide a relatively large field of view for the lock-on-before launch guidance sensors generally mounted in the forward ends of such missiles. As a result of the above described configuration, the frontal aspect of the aircraft can be reduced to essentially the combined frontal aspects of the canopy, the air intake(s) and the forward radar dome thereby minimizing the aerodynamic drag and radar signature of the aircraft.

BRIEF DESCRIPTION OF THE DRAWINGS

FIG. 1 is an isometric view of a fighter aircraft configured to provide minimum aerodynamic drag and radar signature compromising flight performance.

FIG. 2 is a side elevational view of a fighter aircraft showing the placement of its canopy, forward radar dome, engine,engine intake ducts, landing gear and weapons.

FIG. 3 is a front elevational view of the fighter aircraft of FIG. 2.

FIG. 4 is a front elevational view of an alternative embodiment of the fighter aircraft of FIG. 2.

DETAILED DESCRIPTION OF THE PREFERRED EMBODIMENTS

Figure 6:
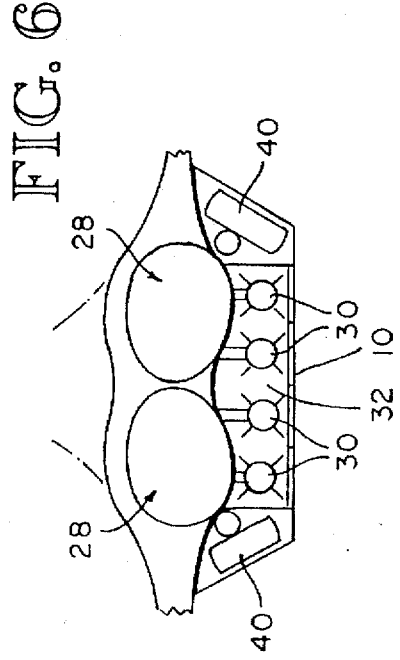
FIG. 6 is a cross-sectional view of the fighter aircraft of FIG. 2 taken along the line 6—6 of FIG. 2.

A modern fighter aircraft 2, as illustrated in FIG. 1, includes a fuselage 4 having a pair of wings 6, a tail 8, and a transparent pilot canopy 10. A main weapons bay (described further below) enclosed by doors 10 is located along the underside of the fuselage 4. An auxiliary weapons bay (also described further below) covered by a door 12 is located on each side of the fuselage 4 forward of the wings 6.

As further illustrated in FIG. 2, the forward portion of the fuselage 4 includes a forward looking radar 16 positioned behind a conical radar dome 18. The flight crew of the airplane 2 are seated in the fuselage 4 beneath the transparent canopy 10. A pair of engines 24 mounted at the rear of the airplane 2 receive combustion air from respective air intakes 26 through intake ducts 28. The intakes 26 are located forward of the wing 6 (FIG. 1) while the engines 24 are located well behind the wing.

Fighter aircraft generally carry several varieties of weapons ranging in size from relatively short missiles to substantially longer missiles. The longer missiles are generally of the radar guided type in which the radar can acquire or "lock-on" to the target after launch. These missiles are therefore known as "lock-on-after-launch" missiles. The shorter missiles generally use a heat seeking guidance system in which their infa-red sensors must acquire or "lock-on" to the target before launch. These missiles are therefore known as "lock-on-before-launch" missiles. As mentioned above, it is important for the missiles, as well as the airplane's main landing gear, to be located near the airplane's center of gravity while minimizing the airplane's aerodynamic drag and radar signature. It has been discovered that all of these design goals can be achieved by taking advantage of the diversity in the size and operating characteristics of the weapons typically carried by fighter aircraft.

As illustrated in FIG. 2, longer missiles 30 are carried in a main weapons bay 32 that is located on the underside of the airplane 2. Shorter missiles 34 are carried separately from the longer missiles 30 in auxiliary weapons bays 36 that are located along the sides of the fuselage 4. Carrying the longer missiles 30 at a location that is different from where the shorter missiles 34 are carried allows all of the significant goals of designing fighter aircraft to be achieved for a number of reasons. First, removing the shorter missiles 34 from the main weapons bay 32 allows the width of the main weapons bay 32 to be minimized since the weapons bay 32 need only be wide enough to accommodate the longer missiles 30. As a result, the width, and hence frontal aspect, of the airplane 2 can be minimized to minimize the airplane's aerodynamic drag and radar signature. As illustrated in FIG. 3, placing the shorter missiles 34 in an auxiliary weapons bay 36 allows the frontal aspect of the airplane 2 to consist essentially of the engine intakes 26, the flight crew canopy 10 and the forward radar dome 18. Alternatively, the engine intakes 26 may be positioned beneath the airplane 2, as illustrated in FIG. 4, so that the frontal aspect of the airplane 2 also consists essentially of the engine intakes 26, the flight crew canopy 10 and the forward radar dome 18. As mentioned above, the engine intakes 26, canopy 10 and forward radar dome 18 are the major components of a fighter aircraft that must have a forward aspect. Providing other components with a frontal aspect unnecessarily increases drag and radar signature.

Figure 5:
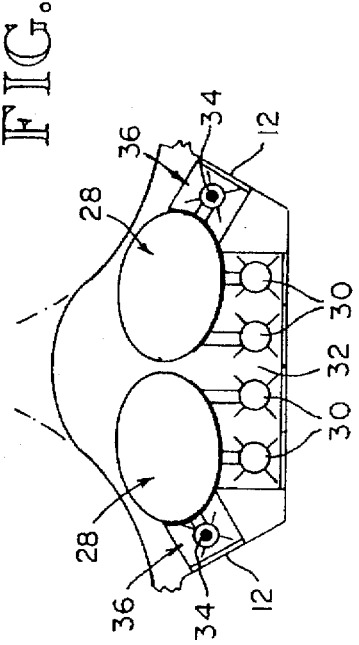
FIG. 5 is a cross-sectional view of the fighter aircraft of FIG. 2 taken along the line 5—5 of FIG. 2.

Another unexpected advantage of separating the longer missiles 30 from the shorter missiles 34 is that it allows all of the missiles 30, 34, as well as the landing gear, to be located at or near the aircraft's center of gravity. As illustrated in FIGS. 2, 5 and 6, the shorter missiles 34 can be positioned at or near the airplane's center of gravity and still allow the airplane's main landing gear 40 to be positioned behind the missiles 34 at its ideal location just aft of the aircraft's center of gravity. Even if the missiles 34 cannot be positioned right at the center of gravity, the relatively light weight inherent in their shorter length prevents them from significantly shifting the airplane's center of gravity after launch. As a result, the flight characteristics of the airplane 2 does not change when the missiles 30, 34 are launched, and the airplane 2 can rotate for takeoff at relatively low speeds.

Figure 7:
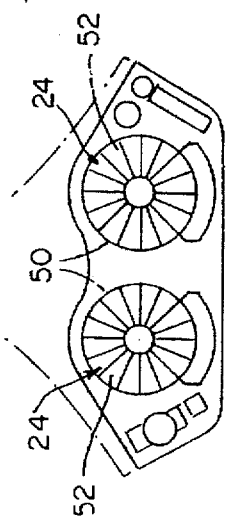
FIG. 7 is a cross-sectional view of the fighter aircraft of FIG. 2 taken along the line 7—7 of FIG. 2.

Separating the longer missiles 30 from the shorter missiles 34 also facilitates shielding of the engines 24 to minimize radar signature. As illustrated in FIG. 7, the engines 24 include a compressor turbine 50 having several circumferentially spaced turbine blades 52 adjacent to forward face of the engine 24. The shape of the turbine blades 52 coupled with their rotation at a high rate of speed, causes them to generate a relatively large radar signature. As a result, it is very important to shield the faces of the engines 24 from external view.

The faces of jet engines are typically not shielded from external view, which results in large radar returns from the engine's fixed and rotating parts. To shield the engine from external view requires optional features, all of which impose penalties in weight, aircraft cross-section, or drag. An example of such feature is the use of long, curved inlet ducts provided for the sole purpose of shielding the engine face from external view. Other examples of engine shielding devices include blocking devices mounted inside the inlet ducts, and flush mounted intakes which are not suitable for supersonic use.

The inventive fighter configuration uses long curved inlet ducts 28 that serve multiple functions not previously associated with inlet ducts. These functions include providing cavities for multiple weapons bays and landing gear stowage without increasing the cross-sectional area of the airplane, and providing structural walls for supporting weapons and other components.

The use of long, curved inlet ducts 28 to shield the faces of the engines 24 requires that the ducts 28 be routed through the fuselage past the aircraft's center of gravity. However, the aircraft's fuselage is normally very crowded at the aircraft's center of gravity because the weapons and the landing gear should be located there. The relatively large diameter of typical air intake ducts can make it difficult for the fuselage to accommodate the intake ducts, weapons and landing gear without increasing the size of the fuselage. Routing the intake ducts through the fuselage past the center of gravity without increasing the diameter of the fuselage can prevent the weapons and/or landing gear from being positioned at their optimum positions at or near the aircraft's center of gravity. Thus, there is normally a tradeoff between shielding the engine faces to minimize radar signature and locating the weapons and main landing gear at the center of gravity to maximize flight performance.

Figure 8:
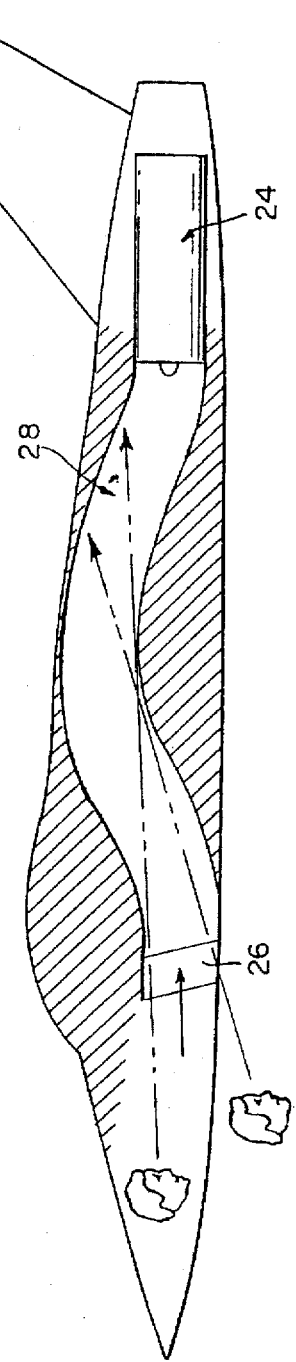
FIG. 8 is a longitudinal cross-sectional schematic of a fighter aircraft showing the routing of the engine intake ducts.
Figure 9:
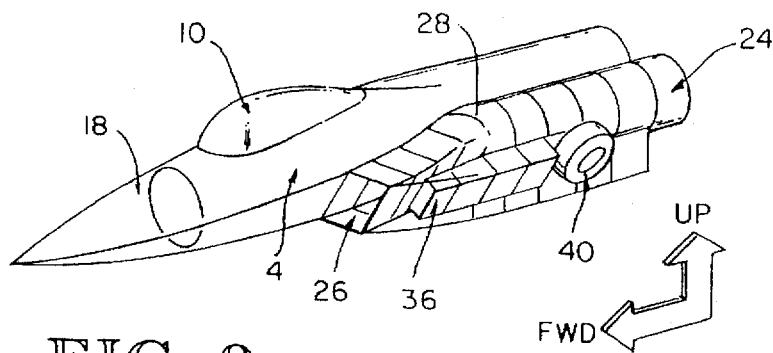
FIG. 9 is an isometric view of a fighter aircraft showing the location of its canopy, forward radar dome, engine intake ducts, auxiliary weapons bay and landing gear.
Figure 10:
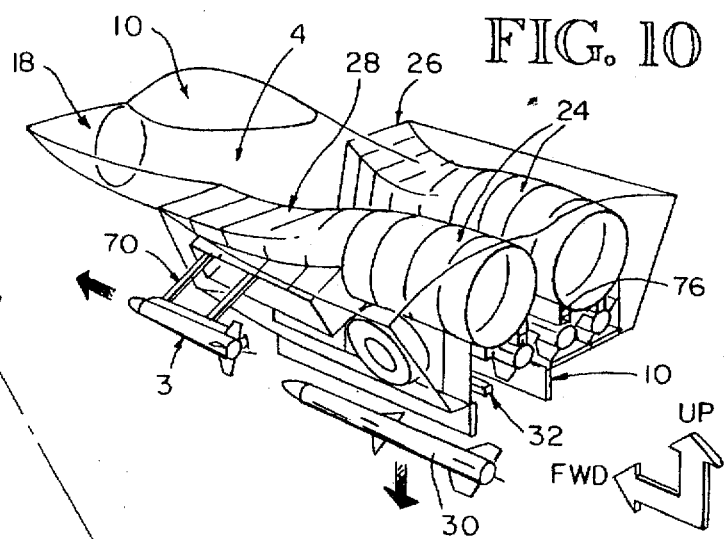
FIG. 10 is another isometric view of a fighter aircraft showing the location of its canopy, forward radar dome, engine intake ducts, auxiliary weapons bay and landing gear.
Figure 12:
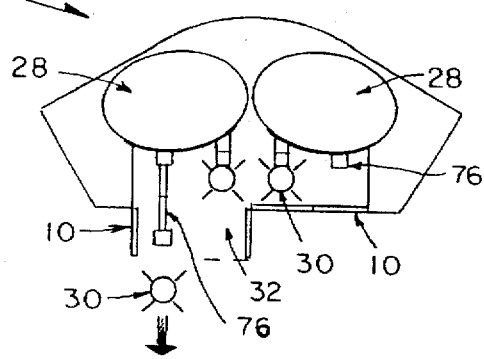
FIG. 12 is a cross-sectional schematic showing the transverse position of the engine intake ducts and the deployed position of the weapons carried in main weapons bays.

The inventive fighter configuration, as best illustrated in FIGS. 8, 9 and 12, shields the faces of the engines 24 while allowing the weapons 30, 34 and main landing gear 40 to be positioned at the center of gravity without increasing fuselage diameter by curving the intake ducts 28 upwardly above the main weapons bay 32 and above and inside the auxiliary weapons bay 36 and landing gear 40. The intake ducts 28 also preferably curve inwardly from front-to-rear, as best illustrated in FIG. 10, to further increase the shielding of the engine faces and to allow the engines 24 to be closer together to minimize asymmetric thrust in the event of a single engine failure.

Figure 11:
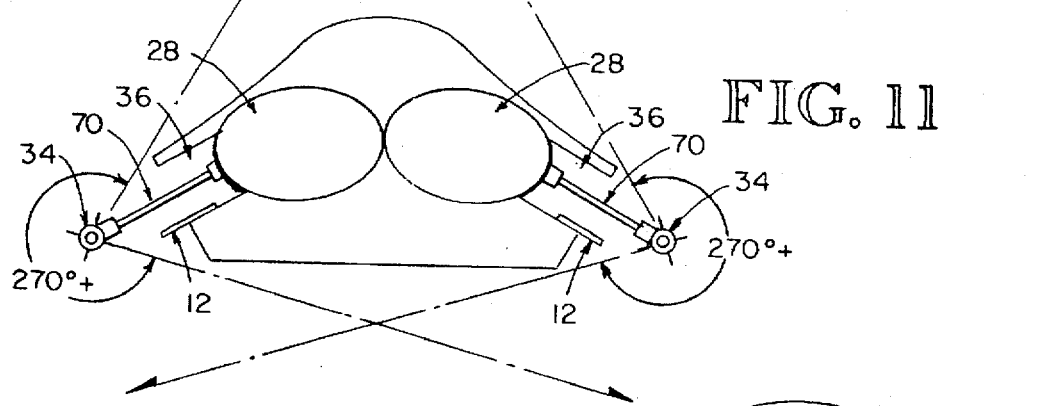
FIG. 11 is a cross-sectional schematic showing the transverse position of the engine intake ducts and the deployed position of the weapons carried in auxiliary weapons bays.

The relatively long length of intake ducts capable of adequately shielding engine faces from external view makes such ducts fairly heavy. However, since it is important to minimize the weight of fighter aircraft, it is desirable to minimize the weight penalty incurred in using long intake ducts. The inventive fighter configuration preferably minimizes this weight penalty by using the ducts 28 as structural members for the airplane 10. As best illustrated in FIGS. 9, 10 and 11, the side walls of the ducts 28 are used as structural members to support the auxiliary weapons bay 36, heat seeking missiles 34, launch mechanism 70 for the missiles 34, and doors 12 enclosing the auxiliary weapons bay 36. Similarly, as best illustrated in FIG. 10 and 12, the bottom walls of the intake ducts 28 are used as structural members to support the main weapons bay 32, radar guided missiles 30, launch mechanism 76 for the missiles 30 and doors 10 enclosing the weapons bay 32.

A further advantage of placing the shorter missiles 34 in the auxiliary weapons bay 36 and out of the main weapons bay 32 is that the field of view of the missiles 34 is wider at the side of the fuselage 4 than it is at the bottom. This advantage is particularly important because the shorter missiles 34 are generally of the lock-on-before-launch variety in which a wide field of view when the missiles are deployed is particularly important. In contrast, the relatively small field of view of missiles deployed from the main missiles bay 32 is not a significant problem for the larger missiles 30 because these missiles are generally of the lock-on-after-launch variety and can acquire their target after they are dropped from the launch mechanism 70.

As best illustrated in FIG. 11, the shorter missiles 30 have a field of view that extends laterally over an angle of at least 270 degrees since the auxiliary weapons bays 36 are located forwardly of the wings 6 so that the wings do not block the missiles' view. The nose of the airplane 2 converges rapidly in front of the auxiliary weapons bays 36 to further increase the field of view of the missiles 34. The missiles 34 thus have a combined field of view of 360 degrees as best illustrated in FIG. 11.

The inventive fighter aircraft configuration thus achieves all of the significant design goals required to minimize aerodynamic drag and radar signature without sacrificing the performance of the aircraft. Although a specific embodiment of the aircraft has been illustrated herein, it will be apparent to one skilled in the art that the inventive configuration if applicable to other embodiments. For example, although the aircraft illustrated herein uses a pair of jet engines 24 having respective intakes 26 and inlet ducts 28, it will be understood that the aircraft may use a single jet engine with a single intake and inlet duct.

What is claimed is:

1. A fighter aircraft having minimized aerodynamic drag and radar signature without sacrificing flight performance, comprising a fuselage having a substantially constant width fore to aft; at least one jet engine; a wing connected to the fuselage; at least one air intake for each jet engine; an air intake duct extending from each air intake to the engine; a radar dome mounted on the forward portion of the fuselage, a transparent pilot canopy mounted behind the radar dome, ahead of the wing, above and between the air intakes; a pair of retractable main landing gear; and a pair of auxiliary weapons bays having doors opening through opposite sides of the fuselage, each auxiliary weapons bay including launch means for deploying at least one missile outboard of the fuselage and forward to the wing to provide a relatively large forward sector field of view of about 270° for the missile, wherein each duct curves inwardly in a serpentine path to avoid the respective auxiliary weapons bay to reduce frontal observation of the engine and to reduce the overall width of the fuselage to the combined width of the air intake and the radar dome, wherein each launch means includes a telescoping arm attachable to the missile and mounted on a wall of the weapons bay opposite the door and adjacent the air intake duct, and wherein each auxiliary weapons bay door folds open when the arm telescopes outwardly.

2. A fighter aircraft having minimized aerodynamic drag and radar signature without sacrificing flight performance, comprising:

(a) a fuselage of substantially constant width fore to aft, the fuselage having a longitudinal axis, a front face, opposed sidewalls, and containing a center of gravity for the aircraft;

(b) a pair of auxiliary weapons bays symmetrically positioned in the fuselage with one auxiliary weapons bay on each side of the longitudinal axis, the bay being positioned to provide 270° field of view for deployed weapons carried in the bays so that weapons deployed from both auxiliary weapon bays provide full 360° forward field of view coverage, one bay opening in each sidewall of the fuselage through folding doors mounted in the sidewall and folding during normal flight to a streamlined, low drag, low radar cross-section closed position;

(c) a pair of retractable landing gear symmetrically positioned with one landing gear on each side of the longitudinal axis, each landing gear behind the center of gravity;

(d) inlet ducts including a pair of symmetrically spaced air intakes, one air intake on each side of the longitudinal axis and symmetrically positioned in the front face of the fuselage, the ducts directing air form a respective air intake at the front face of the fuselage to at least one engine mounted in the rear of the fuselage, each duct curving inwardly to define a cavity in the fuselage for the respective auxiliary weapons bay; the curve of the duct hiding the engine from frontal observation to reduce the radar cross-section of the aircraft; and, (f) launch means mounted in each weapons bay on a wall of the weapons bay adjacent the duct, the launch means being adapted for holding a respective missile in the weapons bay and for extending the missile into the airstream ahead of the wing on the side of the fuselage a folding door.

3. A fighter aircraft comprising a fuselage; at least one jet engine; a wing connected to the fuselage; the fuselage having a substantially constant width fore to aft; at least one air intake for each jet engine; an air intake duct extending from each air intake to the engine; a radar dome mounted on the forward portion of the fuselage, a transparent pilot canopy mounted behind the radar dome, ahead of the wing, and between the air intakes; a pair of main landing gear; and a pair of auxiliary weapons bays opening through opposite sides of the fuselage, relatively short missiles being carried in the auxiliary weapons bays, each auxiliary weapons bay including launch means for deploying each relatively short missile outboard of the fuselage and forward of the wing to provide a relatively large field of view of about 270° for the missile, wherein each duct curves inwardly in a serpentine path to avoid the respective auxiliary weapons bay and to reduce observation of the engine.

4. fighter aircraft, comprising:

(a) a fuselage of substantially constant cross-section fore to aft and housing at least one engine and at least one internal weapons bay for storing weapons in the fuselage to avoid drag and radar signature penalties and having doors openable in the fuselage, the frontal aspect of the fuselage being confined to the combined frontal aspect of a canopy, a radar dome, and an air inlet;

(b) at least one serpentine inlet duct extending from the air inlet to the engine to conceal the engine from radar observation, the ducts curving to avoid the weapons bay and providing structural support for the weapons bay to reduce overall weight of the aircraft; and (c) a wing mounted on the fuselage, wherein the constant cross-section fuselage optimizes overall aircraft performance especially by minimizing drag and radar cross-section.

5. The aircraft of claim 4 wherein the air inlet is divided into a pair of inlets disposed on opposite sides of the radar dome.

6. The aircraft of claim 4 further comprising:

retractable main landing gear located slightly behind a center of gravity for the aircraft to allow rotation of the aircraft at relatively low takeoff speeds.

7. The aircraft of claim 6 wherein at least one weapons bay door opens in a side of the fuselage.

8. A method for achieving low aerodynamic drag and low radar cross-section in a fighter aircraft, comprising the steps of:

(a) storing munitions in weapons bays in a fuselage of the aircraft while allowing deployment of the munitions at sides of the fuselage by opening doors in sidewalls of the fuselage and extending the munitions from the weapons bays;

(b) maintaining a substantially constant cross-section of the fuselage fore to aft with minimum drag and minimum radar cross-section by curving air inlet ducts around the weapons bays; and (c) providing structural support for the weapons bays through the ducts to reduce the overall weight of the aircraft.

9. The method of claim 8 further comprising the step of:

positioning the weapons bays so that the munitions can be deployed from each weapons bay to provide full 360° frontal sector observation for the fighter.

\* \* \* \* \*